United States Patent [19]

Maeding

[11] 4,103,109
[45] Jul. 25, 1978

[54] CCD MULTIPLEXER
[75] Inventor: Dale G. Maeding, Carlsbad, Calif.
[73] Assignee: Hughes Aircraft Company, Culver City, Calif.
[21] Appl. No.: 782,813
[22] Filed: Mar. 30, 1977
[51] Int. Cl.² .............................................. H04J 3/04
[52] U.S. Cl. .................................................. 179/15 A
[58] Field of Search ........................ 179/15 A, 15 BA; 364/200

[56] References Cited

U.S. PATENT DOCUMENTS

| 3,602,647 | 8/1971 | Kawashima et al. ............. 179/15 BS |
| 3,665,406 | 5/1972 | Gallagher et al. ..................... 364/200 |
| 3,740,482 | 6/1973 | Plank et al. .......................... 179/15 A |
| 3,763,318 | 10/1973 | Ross et al. .......................... 179/15 A |

Primary Examiner—Douglas W. Olms
Attorney, Agent, or Firm—Martin E. Gerry; W. H. Mac Allister

[57] ABSTRACT

A multi-channel multiplexer for converting multi-channel parallel information to single channel serial information. In the preferred embodiment, the invention utilizes the delay characteristics of charged-coupled devices (CCD) to sequentially delay simultaneous inputs and add them at the output thereby performing a parallel-to-serial multiplexing function. Multiple delay gate electrodes coupled to clocks having varying frequencies are utilized to sequentially delay the charge being transferred.

9 Claims, 13 Drawing Figures

CCD MULTIPLEXER

BACKGROUND OF THE INVENTION

1. Field of the Invention

The present invention relates to multi-channel multiplexing whereby the simultaneous inputs from a plurality of parallel channels may be combined to form a serial output on a single output channel. More particularly, the present invention is a multi-channel CCD multiplexer which utilizes the delay characteristics inherent in the transfer of charges from one CCD electrode to the next electrode to sequentially delay simultaneous inputs which are added at the output to form a serial signal output.

2. Prior Art

In many applications of CCD circuitry, it is necessary to perform high speed multiplexing in conjunction with CCD signal processing schemes. For example, such a function may be necessary for electronically reading out signals from a focal plane or in conjunction with a line-converter memory where data is multiplexed into memory registers and then reassembled using a multiplexer at the output of the registers at data rates on the order of 20 megabits per second. Multiplexing which transfers parallel information from a plurality of channels to serial information on a single channel is presently accomplished by transferring the parallel information into a register and then shifting the information through each register channel to a common output point. In CCD devices of this type, information from a plurality of channels is gated into a CCD register and then the charge on each register is transferred to the next register with the application of appropriate clocking signals until the information is provided at the output from the first channel gate. For example, in a four-channel CCD device, the charge stored in the area of the channel 4 gate is transferred to the channel 3 gate and then to the channel 2 gate and finally to the channel 1 gate before being provided as an output; the charge on the channel 3 gate is transferred to the channel 2 gate and then to the channel 1 gate before being provided as an output; and the charge on the channel 2 gate is transferred to the channel 1 gate before being provided as an output.

Because the amount of charge transferred from one gate to the next depends on the duration of the clock causing the transfer, it is essential in devices where many transfers are required that slow frequency clock signals be utilized to assure high transfer efficiency and to minimize the amount of charge remaining and thereby minimize the amount of "cross-talk" inherently involved due to dispersion in the CCD register. When multiplexing data rates requiring high speed transfers (on the order of 20 megabits per second) are attempted, it is necessary to either decrease the bit length or to limit the number of charge transfers which occur. In addition, most prior art CCD multiplexers require a maximum clock rate equal to the data rate.

SUMMARY OF THE INVENTION

The present invention in its preferred embodiment uses the delay characteristics of CCD gates to sequentially and separately delay simultaneous inputs from a plurality of channels and add them at the output to thereby perform a parallel to serial multiplexing function. In a four-channel p-channel example of the preferred embodiment, the charges from four parallel CCD channels are clocked through a plurality of delay gate electrodes each coupled to a different clock signal. A first delay gate electrode is coupled to a first clock to provide delay gates on each of four channels. When the appropriate clock turns OFF, i.e., when the potential well under the electrode is at its smallest negative voltage, the charge from the first channel transfers to a common collector gate which is at a potential equal to or greater than the largest negative value attained by any of the channel gates. This means that the common collector gate is always ON and any charge transferred into the gate adjacent to the common collector gate will be immediately transferred to the output when that gate is turned OFF via an output diffusion or some other method. The charges at the other three gates coupled to the first clock also transfer to their respective first electronic delay gates where they are stored until an appropriate transferring clock occurs. The transfer to the adjacent gate does not occur at the same time because the adjacent delay gate electrodes are in the ON position, i.e., at the greatest negative potential, which prevent the transfer of charge from one gate to the next. Thus, only the data from channel 1 is transferred to the output at the first transfer time T1.

At a later time T2, a second clock signal having a frequency twice that of the first clock signal is applied to a second electrode which forms a gate in channel 2. When the second clock turns OFF, the charge from the channel 2 gate of the first delay electrode transfers from the channel 2 gate of the second delay gate electrode to the output because the next adjacent gate is the always ON common collector gate. The data from channel 2 thus begins to appear at the output at second time T2. The charge existing on the channel 3 and channel 4 gates defined by the first electrode remain on the substrate under the electrode since they are prevented from transferring by a third delay-gate electrode which is in the ON state.

At the next time T3, the second clock applied to the second electrode turns ON again and a third clock applied to a third electrode interposed immediately adjacent to the first electrode in channels 3 and 4 turns OFF allowing the charge on channels 3 and 4 to transfer from the channel 3 and channel 4 gates defined by the first delay electrode. The channel 3 delay gate defined by the third electrode is immediately adjacent to the common collector gate in the ON state thus allowing the charge from channel 3 to begin to transfer immediately to the output at time T3.

Finally, the second clock coupled to a second delay gate electrode is again turned OFF. Since the second delay gate electrode is immediately adjacent to the channel 4 delay gate defined by the third delay gate electrode, the charge stored thereon is transferred to the channel 4 delay gate defined by the second delay gate electrode. This second delay gate electrode is also immediately adjacent to the output gate, thus causing the charge to begin to be immediately transferred to the output at time T4. While this and subsequent descriptions refers to p-channel devices, n-channel devices may also be used in which event all voltages would be positive.

A capacitor coupled between the output and ground and a resistor coupled between a drain voltage source and the output allows the output charge to be characterized as a decreasing exponential. Circuitry, such as an amplifier, may then be used to appropriately shape and regulate the output signal.

While the above description has been made with respect to a four-channel CCD device, the present invention may be extended to any number of channels. It will also be appreciated that various other delay schemes such as flip flop or delay line circuits may be devised to accomplish the multiplexing scheme described and that the invention in its broader aspects is not limited to CCD devices.

Thus, it is the general object of the present invention to provide a multi-channel multiplexer.

It is yet another object of the present invention to provide a multi-channel CCD multiplexer.

Still another object of the present invention is to provide a multi-channel CCD multiplexer capable of high speed multiplexing utilizing small low-powered circuitry which will operate at high speeds on the order of 100 megahertz.

It is still another object of the present invention to provide a multiplexer in which the maximum clock rate is equal to one half of the data rate.

Still another object of the present invention is to provide a CCD multiplexer in which a smaller quantity of cross-talk due to dispersion in the CCD register occurs.

Yet another object of the present invention is to provide a CCD multiplexer in which only half of the channels to be multiplexed will have only one transfer at the highest transfer rate, i.e., at one-half of the data rate.

Still another object of the present invention is to provide a CCD multi-channel multiplexer capable of high speed operation with a minimum number of high speed transfers to thereby increase overall transfer efficiency in the multiplexing process.

Additional and various other objects and features of the invention will be better understood when the following detailed description is read in conjunction with the accompanying drawings.

DETAILED DESCRIPTION OF THE PREFERRED EMBODIMENTS

The present invention is a multi-channel multiplexer. In its broadest aspects, the invention utilizes delays to sequentially delay simultaneous inputs from a plurality of channels and add them at the output to thereby perform a parallel-to-serial multiplexing function. While any delay device may be utilized, the present invention has particular application in multi-channel CCD devices where the inherent delay characteristics in the clocked transfer of charge from one delay electrode to the next may be used to sequentially delay simultaneous inputs on a plurality of channels and then add them at the output to thereby perform a parallel-to-serial multiplexing function. Because the present invention has particular usefulness in a CCD implementation, the subsequent explanation will be made in reference to CCD devices. In addition, the explanation refers to p-channel devices for illustrative purposes only and the present invention is equally applicable to n-channel CCDs.

Figure 1:
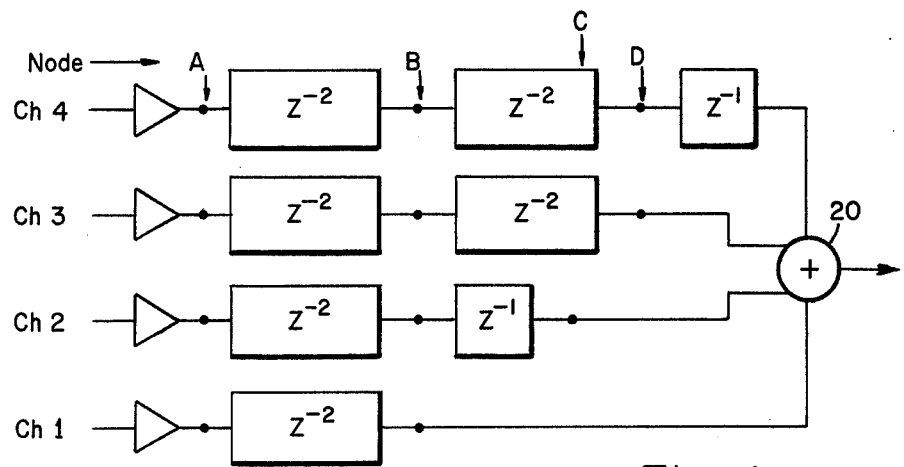
FIG. 1 is a block diagram illustrating the operation of a four-channel multiplexer in accordance with the present invention.

Referring first to FIG. 1, there is shown a block diagram of a four-channel multiplexer which may be utilized to illustrate a basic concept of the present invention. In FIG. 1, the basic (i.e., smallest) unit time delay is represented by $Z^{-1}$. The particular advantage of a CCD implementation of the present invention may be understood by reference to FIG. 6 which shows an illustrative plot of the transfer efficiency which exists in a CCD device. In that plot, it will be observed that as the charge transfer time increases, the amount of total charge transferred from one CCD gate to the next also increases. For example, if the transfer time permitted for transferring the charge from one CCD gate to the next is $T_1$, then from FIG. 6, only slightly more than 50% of the charge will be transferred to the second gate with the rest of the charge remaining on the first gate to corrupt incoming data and cause undesirable cross-talk. On the other hand, if the amount of time for the transfers increase to $T_2$, nearly 100% of the charge will be transferred to the adjacent gate. Where a large number of transfers must be made, it is clear that the transfer time must be such as to minimize the amount of charge lost or left behind to corrupt incoming data and to maximize tha mount of charge transferred each time a transfer is made.

Figure 6:
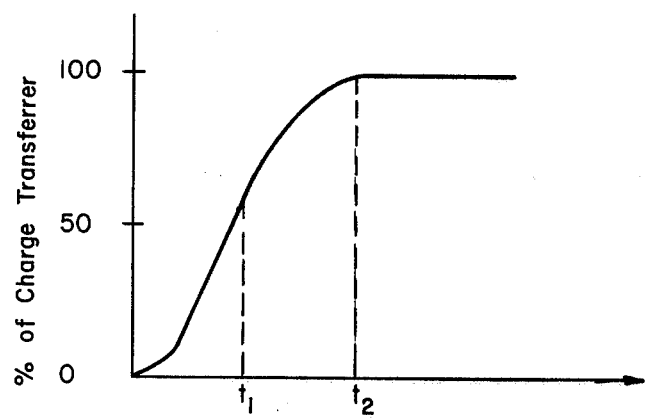
FIG. 6 is a plot showing an exemplary curve of the transfer efficiency of a CCD device.
Figure 7:
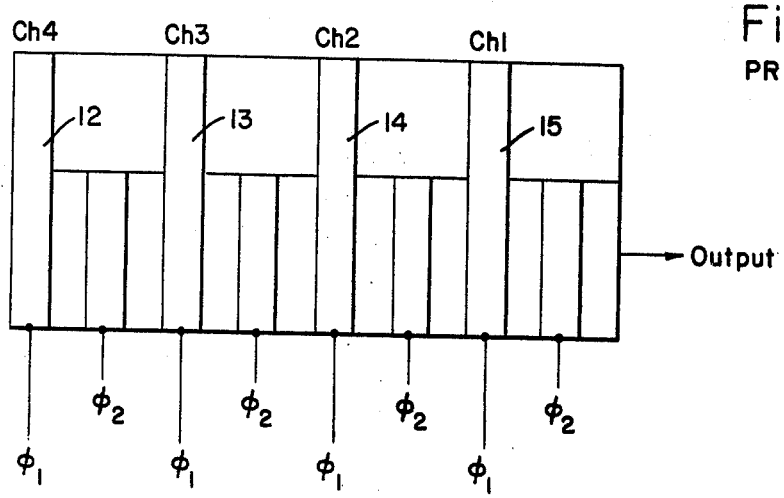
FIG. 7 illustrates a prior art parallel to serial CCD converter.

As an example, if a parallel transfer was made into the CCD register 10 in FIG. 7 which shows the upper portions of a prior art CCD multiplexer conduction pattern, and a subsequent serial transfer was made so that the charge on channel 4 was first transferred to channel 3 and then to channel 2 and then to channel 1 in response to clocks $\phi_1$ and $\phi_2$ coupled as shown utilizing a method common in conventional devices, the information from channel 4 would undergo three interchannel transfers before it would provide an output from gate 15. Consequently, if a transfer time $T_1$, as shown in FIG. 6, was allowed for each transfer, then only ≈50% of the charge would be transferred from electrode 12 to electrode 13, only ≈50% of the remaining charge would be transferred from electrode 13 to electrode 14 and only ≈50% of the charge transferred to electrode 14 would be transferred to electrode 15. The resultant charge from channel 4 residing on electrode 15 in a parallel-to-serial conversion would thus be only approximately 12 to 13% of the charge originally stored by electrode 12 in channel 4. More importantly, however, the 87-88% of the charge lost would remain in the channels to corrupt subsequent signals in all channels. On the other hand, if a transfer time equal to $T_2$, as shown on FIG. 6 occurred then the charge from electrode 12 would be almost entirely transferred to electrode 15 and much less cross-talk would occur. The data from the various channels would still corrupt the data from other channels to the same degree, however, because of the interchannel transfer method employed.

It will thus be appreciated that the more total transfers which are required, the longer each transfer will have to be to obtain useful information. Conversely, if rapid transfer is desired, only a limited number of such transfers will be possible. It should be noted that the percentages in FIG. 6 have been shown at $\simeq 50$ and 100 for illustrative purposes only. In reality, the percentage of charge transferred at time T1 will be approximately 99.9 percent and the percentage charge transferred at time T2 will be approximately 99.99 percent.

The present invention permits a minimum number of high speed transfers to be made while still allowing high speed multiplexing to occur. In addition, the present invention eliminates much of the interchannel cross-talk since no interchannel charges are made. Referring again to FIG. 1, $Z^{-1}$ represents a unit time delay which may be taken for illustrative purposes to be equal to $T_1$ as shown in FIG. 6. By appropriate clocking of the transfer from one CCD electrode to the next, a CCD can be configured in such a way that it will provide a delay of $Z^{-N}$ where N is equal to any positive integer. In the present example, delays of one unit and two units are required and are shown as blocks with labels $Z^{-1}$ and $Z^{-2}$ respectively.

The four-channel multiplexer of FIG. 1 operates as follows. The four signals appearing on channels 1 through 4 are initially and simultaneously sampled every four delay time units and are stored at node A until the next sampling time at least four delay units later. After two delay units, the samples appearing at node A are shifted to node B at which time the smaple from channel 1 appears at the summing device 20 and the output takes on the value of the signal from channel 1. After the next single time delay unit, the sample in channel 2 is shifted to node C by an appropriate clock whereupon the value of the signal from channel 2 will appear at summing device 20 and the output will take on the value of the channel 2 signal. Two time delay units after the signals appeared at node B, the samples from channels 3 and 4 will be shifted to node D whereupon the output from channel 3 appears at summing device 20 so that the output will acquire the value of the sample from channel 3. Finally, the sample occurring on channel 4 is delayed one additional delay time unit after which the sample will appear at summing device 20 and the output will take on the value of channel 4. Thus, the process of delaying each channel a different and unique number of delay units and summing the outputs at summing device 20 will cause the signals from all four channels to be sequentially read out. It will be apparent that since only one fast transfer ($Z^{-1}$) is required in only one half of the channels, the transfer speed of all transfers may be increased over the maximum speed possible in the prior art device of FIG. 2. Further, the lack of interchannel transfer prior to the combining at summary point 20 reduces the amount of interchannel cross-talk.

Figure 2:
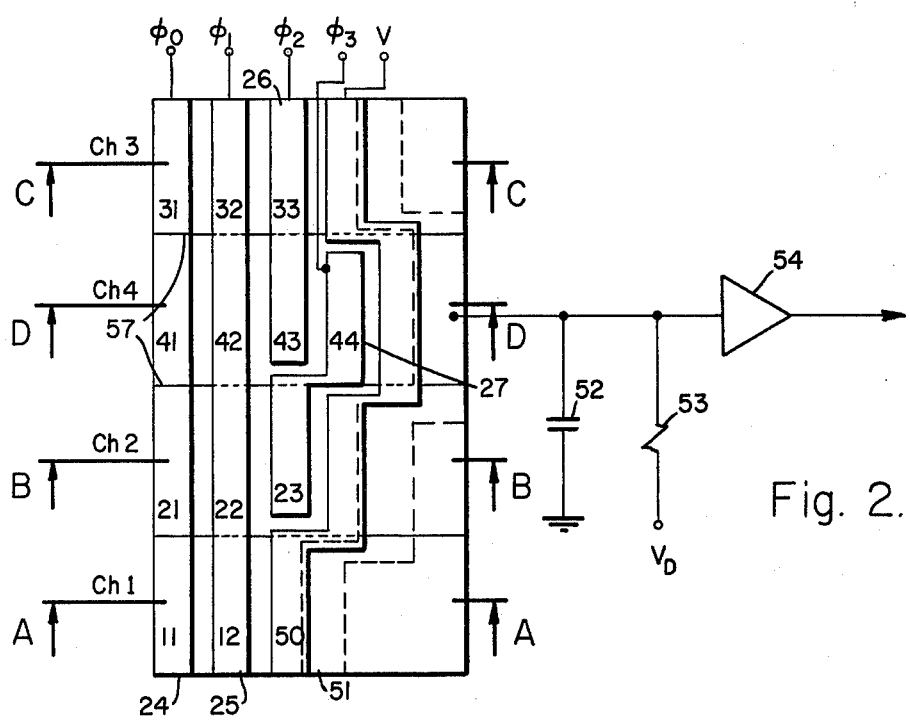
FIG. 2 shows a top view of a CCD electrode configuration and output circuitry illustrating one embodiment of the present invention.

An actual example of a representative CCD implementation which may be utilized in practicing the present invention may be understood by reference to the CCD electrode pattern and circuit shown in FIG. 2. Initially, it will be appreciated that any conduction pattern utilized must be such that unidirectional transfer of the charge toward the output occurs.

Figure 9:
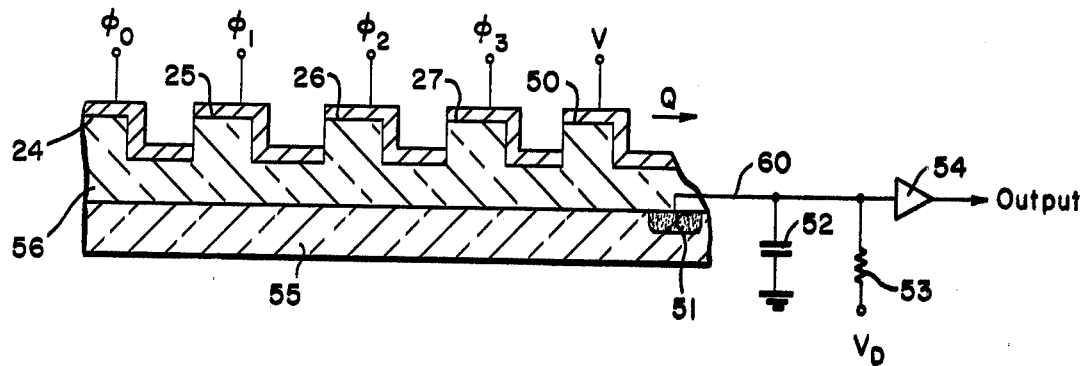
FIG. 9 is a cross-section view of the conductor configuration of FIG. 2 through channel 4.

Referring now to FIG. 9, which shows a cross-section detail of the electrodes of FIG. 2 through channel 4 as indicated by section D—D, the desired pattern may be formed by any suitable technique well known in the art utilizing any suitable material for electrodes 25, 26, 27 and 50; insulating layer 56; and substrate 55 such as described by Smith in U.S. Pat. No. 3,697,786 or by Sato et al in U.S. Pat. No. 3,999,152. For example, the substrate may be n-type doped silicon 55 with silicon dioxide insulating layer 56 disposed thereon. Electrodes 24, 25, 26, 27 and 50 of any suitable conductive material such as aluminum or polysilicon, may then be deposited on the surface of insulating layer 56. It will be appreciated also that the upper part of the electrode may be of one conductive material while the buried or lower electrode may be of another conductive material and that they need not be physically connected as shown so long as they are electrically coupled. The purpose of the upper-lower type electrode shown in FIG. 9 is to assure unidirectional transfer of the charge Q in the direction indicated. The clock signal and output may be coupled via leads to the appropriate clock source or output circuitry respectively, as illustrated by the $\phi_0$, $\phi_1$, $\phi_2$ and $\phi_3$ leads and output lead 60 of FIG. 9.

The transfer of the charge from any of the parallel channels to form a serial signal on a single channel may be accomplished by collecting the charge from any channel on output diffusion 51. There is a screen electrode gate 50 immediately before the output diffusion which is in the always ON state where the electrode is placed across all channels so that the charges from any channel will be transferred under the screen electrode gate to the output diffusion. Thus, unlike other electrodes which form a separate gate in each channel across which they are placed, electrode 50 forms a single screen gate across all channels. Output diffusion 51, which is p-doped if substrate 55 is n-doped or n-doped if substrate 55 is p-doped, may then be formed in a region which may have a cross-section as shown on the order of 2 microns square. A wire lead 60 may then be attached to region 51 to complete the signal output means. Of course, any other suitable output means may be utilized to practice the present invention.

Referring again to FIG. 2, electrodes 24, 25, 26 and 27 showing just the upper portions of the electrodes as illustrated in FIG. 9, are positioned in the pattern shown to cover one or more gate regions in one or more of a plurality of channels. Thus, electrode 24 extends over and defines gate regions 31, 41, 21 and 11 where the charge from the various channels are transferred and stored in response to clock $\phi_0$. It will be appreciated that $\phi_0$ must be such that a new set of charges representing parallel information is prevented from entering gate 32, 42, 22 and 12 so as to corrupt the just previous set of charges transferred prior to their transfer through gate 50. For example, $\phi_0$ may be the same as $\phi_2$. This will be seen from FIG. 3b and FIG. 2 since all of the charges will be transferred from gates 32, 42, 22 and 12 at or before the time $\phi_2$ turns OFF. Thus, these gates may again have charges transferred into them. Since no charge will be transferred from these gates until $\phi_1$ next turn OFF, no combining of the charges will occur because the last outputted charge from channel 4 (gate 44)

will occur at time $t_d$ prior to the next time $\phi_1$ turn OFF. According to this nomenclature, ON thus indicates a deep charge or large negative voltage at the substrate (e.g. $-12$ volts) preventing the charge from transferring, while OFF indicates a shallow or lower negative voltage at the substrate (e.g. $-4$ volts) which causes the charge to transfer if the next gate into which the transfer is made is ON. Channel stops 57, which may be n-doped if substrate 55 (FIG. 9) is n-doped or p-doped if substrate 55 is p-doped, are placed between the gates of separate channels to prevent charges from transferring from one channel to the next and thus increasing the cross-talk. Of course, any technique to accomplish this purpose may be utilized such as the oxide isolation or thick oxide techniques well known in the art.

In FIG. 2, charges from channels 3, 4, 2 and 1 where the channels are arranged in that order, are transferred simultaneously by clock $\phi_0$ (equal to $\phi_2$) to input gates 31, 41, 21 and 11 respectively, by clocking electrode 24. In order to transfer the charges from the input gates to the output collector diffusion 51, three clocks indicated by the symbols $\phi_1$, $\phi_2$ and $\phi_3$ are coupled to electrodes 25, 26 and 27 respectively. The charges transferred through the delay network provided by electrodes 25, 26 and 27 are collected at output diffusion 51 after passing under electrode gate 50 which is always in the ON state. This is assured by setting a constant voltage V to a value which yields negative potential at the substrate surface greater than or equal to the largest negative voltage appearing at the substrate surface under electrode gate 50. Output diffusion 51 is coupled to ground through capacitor 52, to drain voltage $V_D$ through resistor 53 and to the output through amplifier 54. Of course, amplifier 54, resistor 53 and capacitor 52 may be replaced by any suitable circuitry desired to shape or regulate the output signal. If the charge from a channel is transferred to gate 50, it is immediately applied to the collecting diffusions 51. Of course, it will be appreciated that any type coupling for transferring the charges transferred along the various channels to the output to form an output signal may be used, for example, the floating gate or reset diffusion technique known in the art. The charge then drains out through resistor 53 to drain voltage $V_D$. Utilizing this output circuit, the output of amplifier 54 will appear as a decreasing exponential as indicated in FIG. 3d.

In operation, electrode 25 provides a transfer delay from node A to node B illustrated in FIG. 1 in channels 1 through 4 when a clock $\phi_1$, chosen to have a period representing two delay units, is applied to electrode 25. Clock signal $\phi_2$, which is applied to electrode 26, provides the two unit delay for transferring charge from node B to node D in channels 3 and 4, as illustrated in FIG. 1. Delay gate electrode 27 coupled to clock $\phi_3$ which oscillates at twice the frequency of either clock $\phi_1$ or $\phi_2$, provides the single delay time unit necessary to transfer the charge in channel 2 from node B to node C and to transfer the charge in channel 4 from node D to the output 20.

Figure 3:
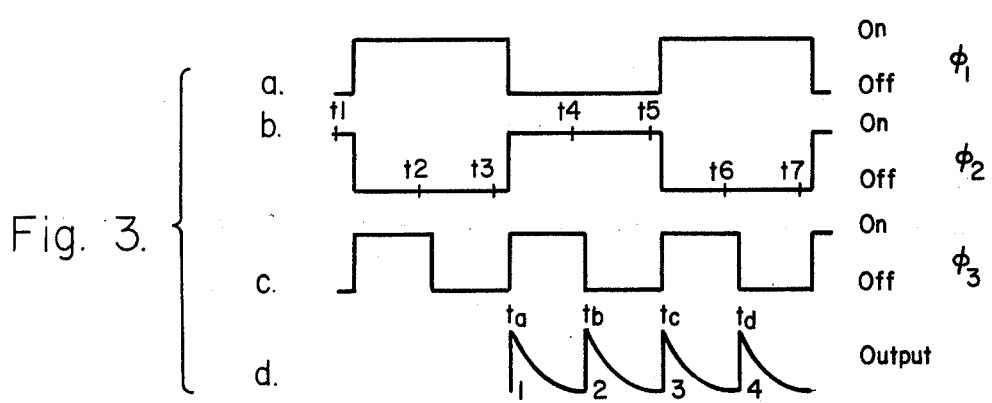
FIGS. 3a, 3b, 3c and 3d illustrate waveforms for the first, second and third clock necessary for the multiplexing operation of the circuit configuration of FIG. 2 and the resultant output.
Figure 10:
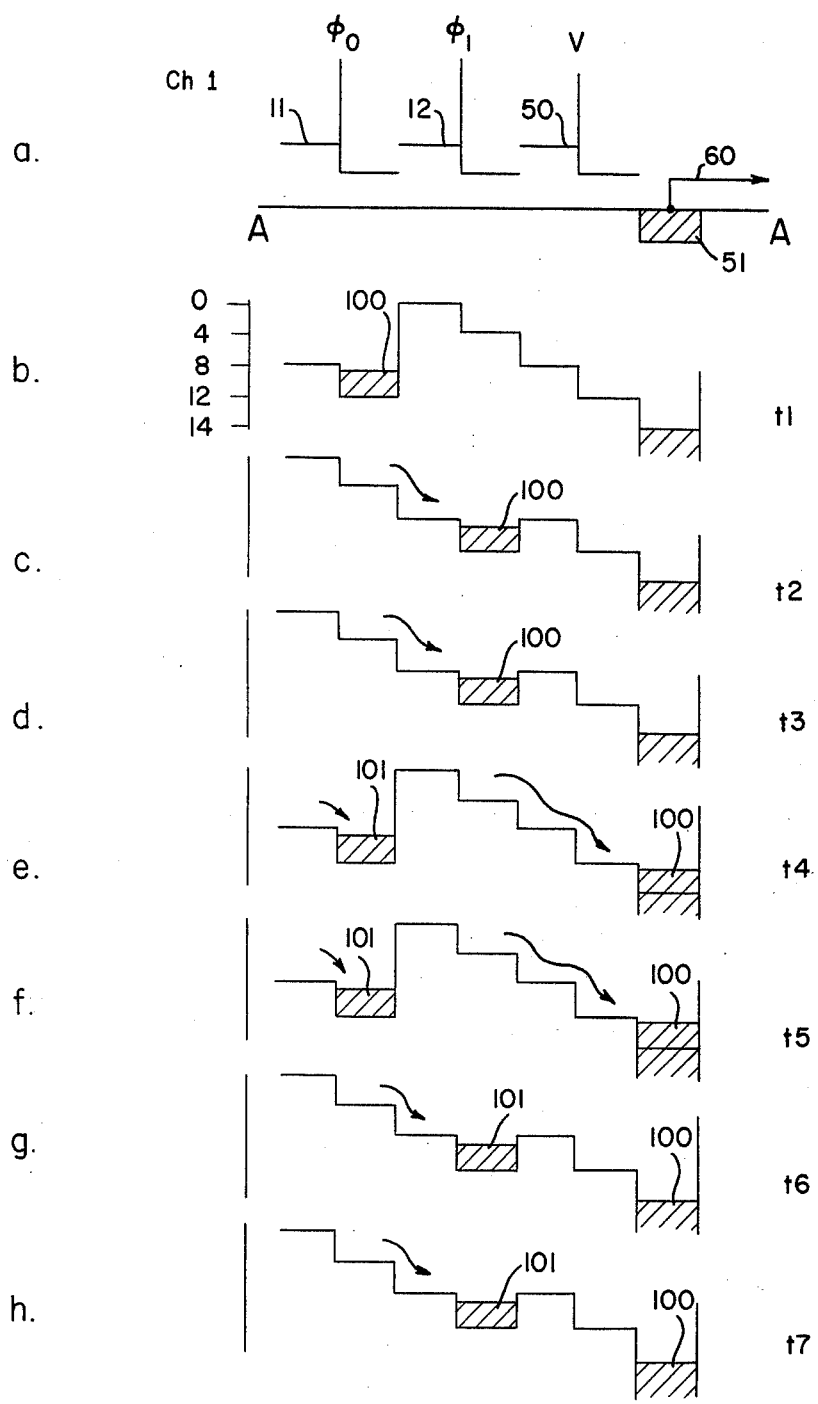
FIGS. 10a–10h, 11a–11h, 12a–12h and 13a–13h show the potential profiles of the cross-section through A—A, B—B, C—C and D—D of FIG. 2 at times $t1$–$t7$ shown in FIG. 3.

Referring now to FIGS. 10, 11, 12 and 13 which illustrate the voltage levels under the gate in cross-sections A—A, B—B, C—C, and D—D of FIG. 2 illustrate the charge movement in the various channels at times t1 through t7 indicated in FIG. 3. Referring first to FIG. 10, FIG. 10a illustrates the conductor pattern through cross-section A—A of FIG. 2 and FIG. 10b through 10h illustrate the time sequence by which a charge 100 is transferred through gates 11 and 12 to the common collector diffusion 51. Thus, at time t1 a charge resides under gate 11 as shown at FIG. 10b. At time t2 clock $\phi_1$ is ON and clock $\phi_2$ is OFF causing charge 100 to transfer to gate 12. At time t4 shown in FIG. 10e, clocks $\phi_1$ is OFF and the clock $\phi_2$ is ON resulting in the transfer of the charge stored at gate 12 to gate 50. Since gate 50 is always ON, i.e., has a greater negative voltage than gates 11 or 12 in the ON state, the charge is transferred to gate 50 then to the output diffusion 51 where it is immediately provided at the output. This transfer to the output begins at time $t_a$ as shown by FIG. 3d. Charge 101 in transfers into gate 11 at the same time that charge 100 is being transferred out commencing at time $t_a$ and the sequence repeats as illustrated in FIGS. 10e through 10h.

Figure 11:
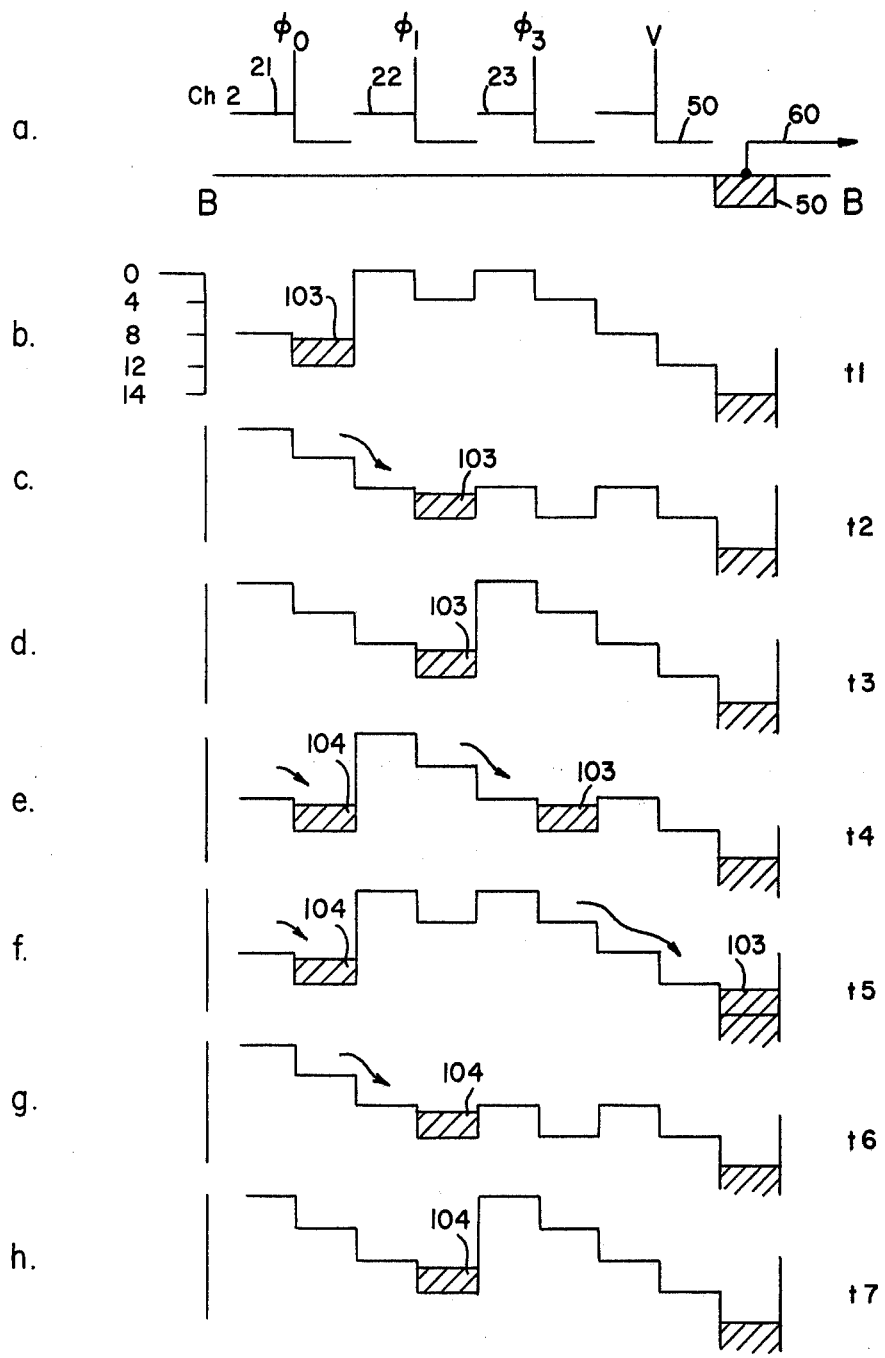

In FIG. 11, the sequence resulting in the transfer of a charge from gates 21 to the output in channel 2 are illustrated. Thus, FIG. 11a illustrates the cross-section B—B shown in FIG. 2 with FIGS. 11b through 11h illustrating the transfer sequence of a charge existing under gate 21 at time t1. Again, at time t2 clock $\phi_1$ has turned ON and $\phi_2$ is turned OFF causing the charge 103 to transfer from gate 21 to gate 22 as shown in FIG. 11c. The charge remains under gate 22 until time $t_a$ when clock $\phi_1$ turns OFF and clock $\phi_3$ turns ON. Thus, at time t4 shown in FIG. 11e charge 103 has transferred to gate 23 which is clocked by $\phi_3$. Since clock $\phi_3$ turns OFF at time tb, the charge 103 of channel 2 will be transferred out commencing at time tb. This result is shown in FIG. 11f illustrating the charge transfer at time t5. FIGS. 11e through 11h also show new charge 104 and its respective transfer position at times t4, t5, t6 and t7, respectively.

Figure 12:
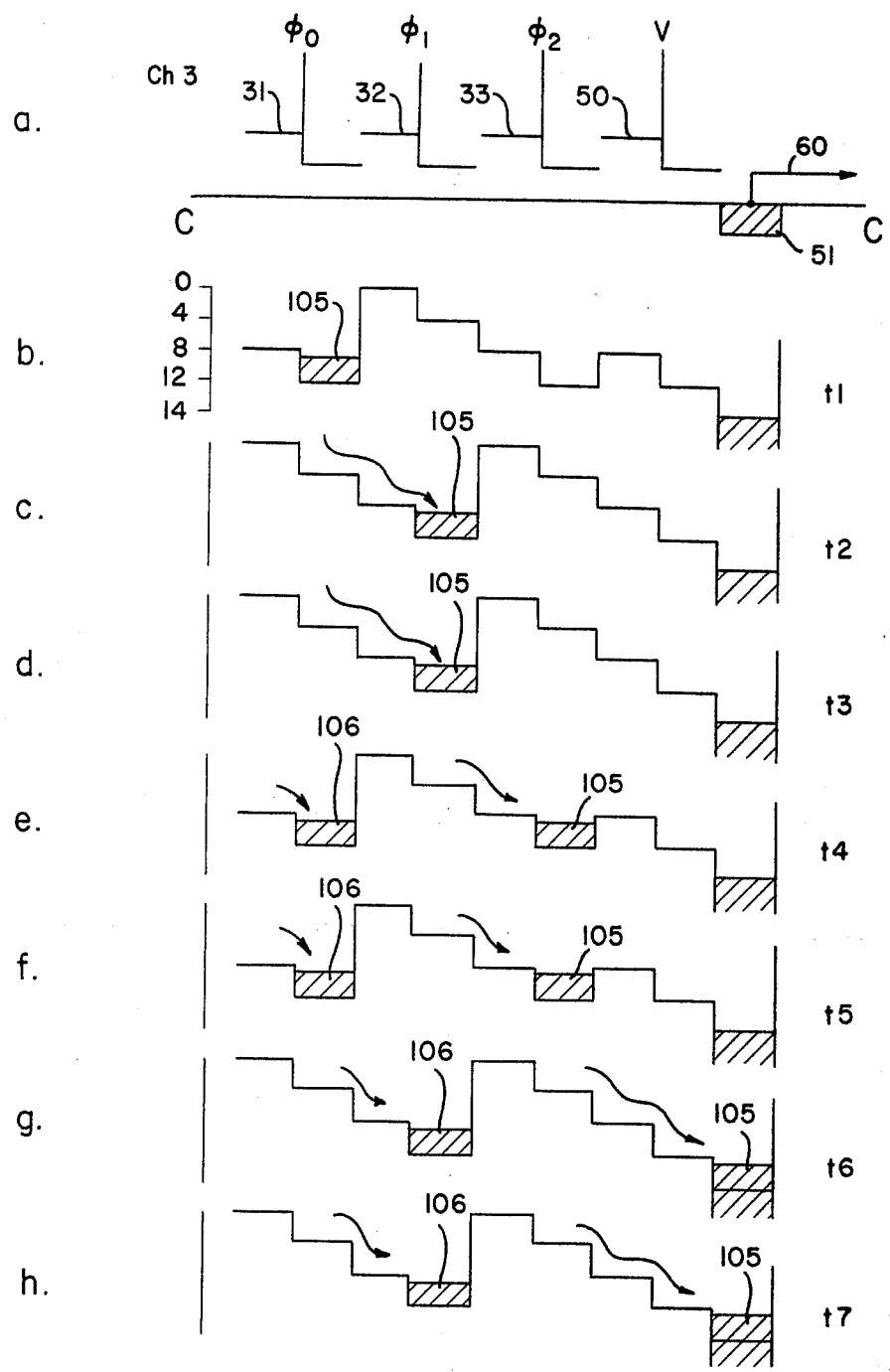

Referring now to FIG. 12, the cross-sections C—C of channel 3 shown in FIG. 2 is illustrated in FIG. 12a with FIGS. 12b through 12h illustrating the time sequence of charge transfer through the gates 31, 32 and 33 of channel 3. Initially at time t1, charge 105 resides under gate 31 clocked by clock $\phi_0$. At time t2 shown in FIG. 12c, the charge has transferred to gate 32 in response to clock $\phi_0$ turning OFF and $\phi_1$ turning ON. The charge 105 remains under gate 32 until time $t_a$ when clock $\phi_1$ turns OFF and clock $\phi_2$ turns ON causing charge 105 to transfer to gate 33. The result of this transfer at time t4 is illustrated by FIG. 12e. Charge 105 remains under gate 33 until time $t_c$ when clock $\phi_2$ turns OFF. This causes charge 105 to transfer immediately to gate 50 and hence to output diffusion 51. The result of this transfer at time t6 is illustrated in FIG. 12g. FIGS. 12e through 12h also illustrate the transfer of the next charge 106 to enter channel 3.

Figure 13:
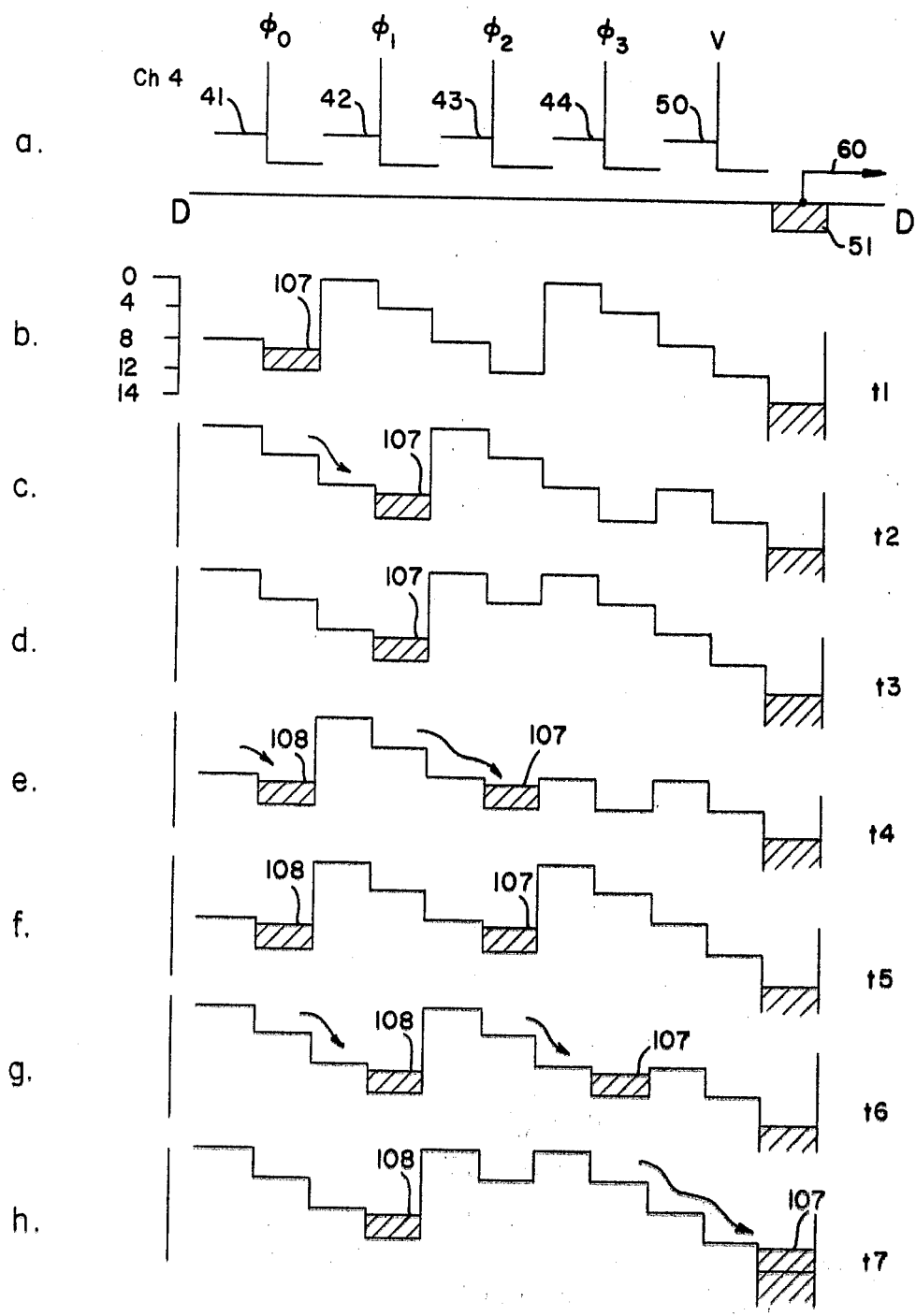

Referring finally to FIG. 13 where FIG. 13a shows the conductor cross-section through D—D of FIG. 2 and FIGS. 13b through 13h show the time sequence of charge transfer, FIG. 13b initially shows the charge 107 residing under gate 41 at time t1. At time t2 when $\phi_1$ has turned ON and $\phi_2$ has turned OFF, the charge 107 is shown transferred to gate 42. Charge 107 remains on gate 42 until time $t_a$ when $\phi_1$ is turned OFF and $\phi_2$ is turned ON. This result is shown in FIG. 13e where charge 107 resides under gate 43 at time t4. The charge remains under gate 43 until time $t_c$ when $\phi_2$ turns OFF and $\phi_3$ turns ON. Thus in FIG. 13g charge 107 is shown under gate 44 at time t6. Finally, at time $t_d$, $\phi_3$ turns OFF causing the charge 107 to transfer to gate 50 where it is immediately provided as an output through output diffusion 51. This result is shown at time t7 in FIG. 13h. Again, FIGS. 13e through 13h illustrate the new charge 108 entering gate 41 and commencing the transfer sequence that was previously described in conjunction with charge 107.

Because of capacitor 52 and resistor 53 coupled to output diffusion 51, the output from amplifier 54 will appear as a decreasing exponential where the charge appearing at the input gates simultaneously in channels 1, 2, 3 and 4 will commence to appear serially at the output at times $t_a$, $t_b$, $t_c$, and $t_d$ respectively. This result is shown in FIG. 3. It will be appreciated that the implementation of the present invention requires that the serial signal output have identifiable time segments during which the information from each channel will appear. This capability may be provided by the DC network shown in FIGS. 2 and 5 which provides individual and separate signals from each channel or may be provided by some other circuitry synchronized with the clock signals to anticipate the existence of a signal.

Figure 4:
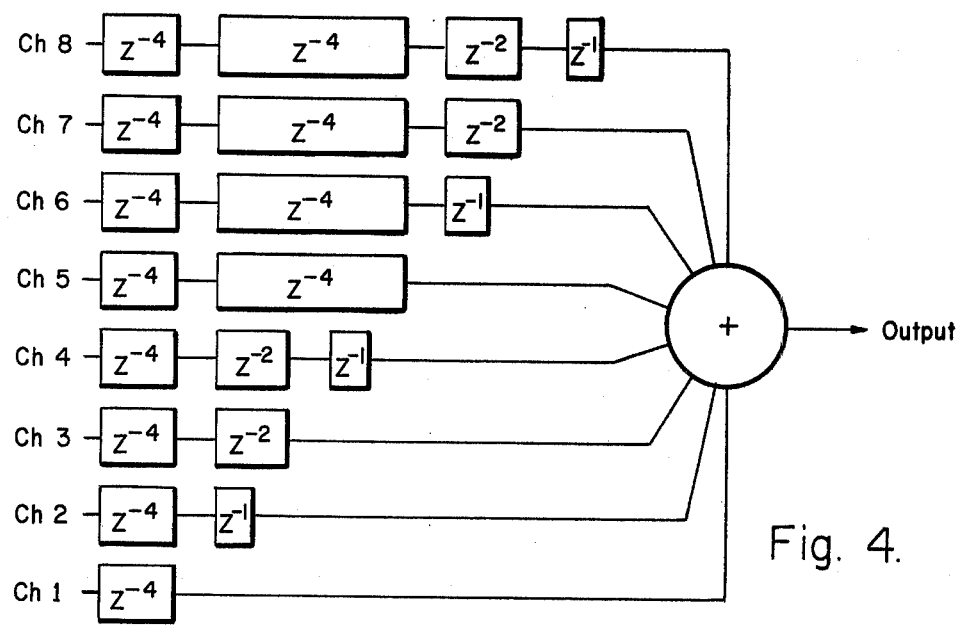
FIG. 4 represents a block diagram of an eight-channel version of the present invention.

The CCD embodiment of the present invention may be extended to $n$ channels by simply observing that the CCD electrodes act as delay devices where the delay duration is defined by the frequency of the applied clock signal. Thus, if each channel is delayed in such a way that $n$ bits of data arrive at the collecting diffusion sequentially, the device will act as a multiplexer. By way of example, FIG. 4 shows a block diagram of an eight-channel multiplexer analogous to the block diagram shown in FIG. 1 for a four-channel multiplexer. In general, $n+1$ clocks will be required to multiplex $2^n$ channels. In addition, electrode segments will be required in various channels for each of the required clocks. Thus, the number of delay gate electrodes will also be equal to $n+1$. For the present eight-channel multiplexer of FIG. 4, the number of required clocks and electrodes will consequently be equal to 4.

Figure 5:
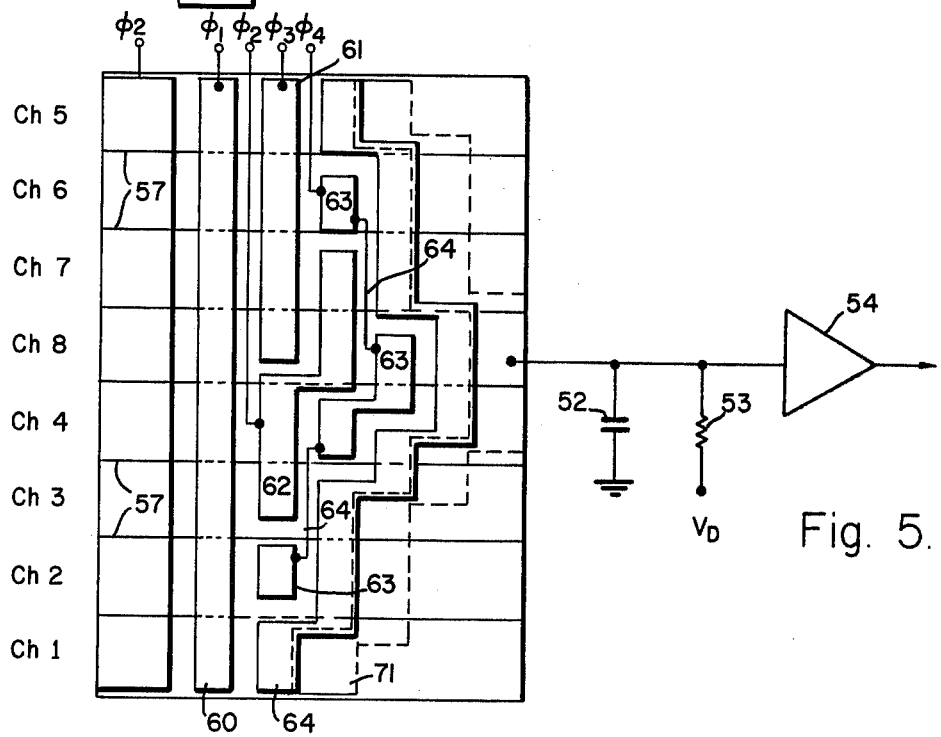
FIG. 5 is a top view of representative conductor configuration for the CCD multiplexer illustrated by the block diagram of FIG. 4.
Figure 8:
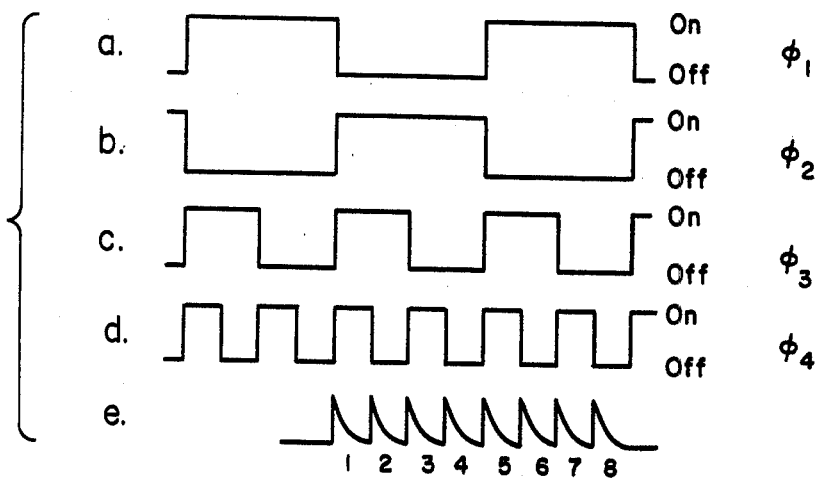
FIGS. 8a, 8b, 8c, 8d, and 8e illustrate the clocks necessary for the operation of the CCD device shown in FIG. 5 and the resultant outputs respectively.

Referring to FIG. 5, clock $\phi_1$ shown in FIG. 8a, is applied to electrode 60 which controls the individual gates in channels 1 through 8; clock signal $\phi_2$, which is the inverse of clock signal $\phi_3$ as shown in FIG. 8b, is coupled to electrode 61; clock $\phi_3$, having a frequency twice that of and $\phi_1$ and $\phi_2$, is coupled to electrode 62; and finally, clock $\phi_4$, shown in FIG. 8b and having a frequency four times that of clocks $\phi_1$ and $\phi_2$, is coupled to electrode 63. While electrode 63 is shown as having three segments, it will be appreciated that clock $\phi_4$ is applied simultaneously to all three sections or alternatively the sections may be joined by potential conduction means 64. The operation of the eight-channel embodiment shown in FIG. 5 is exactly analogous to that previously described in conjunction with FIG. 2 for the four-channel multiplexer. Thus, the output from amplifier 54 will appear as a decreasing exponential, as shown in FIG. 8e, if a charge exists on each of the eight channels. Of course, if a charge does not exist on any one or more of the channels, the particular decreasing exponential will not occur.

The construction of a CCD device, in accordance with the electrode configurations disclosed in FIG. 2, and FIG. 5, may be accomplished by techniques well known in the art such as that disclosed by Smith in U.S. Pat. No. 3,697,786 entitled "Capacitively Driven Charge Transfer Devices" filed Oct. 10, 1972. The theoretical operation and method by which charges are transferred from one electrode to the next are also well known and discussed fully in the aforementioned Smith patent.

It will, of course, be appreciated that the multiplexing technique disclosed by the present invention may be practiced utilizing conventional delay circuits or flip-flops to provide the necessary delay between the output of the parallel channels and the single channel containing serial information. It will also be appreciated that while the various specific embodiments disclosed or preferred will be obvious to those in the art, that changes and modifications may be made without departing from the invention and its broader aspects. That it is therefore the aim of the dependent claims to cover all such changes and modifications as follow in the true spirit and scope of the invention.

What is claimed is:

1. A CCD multiplexing device for converting individual signals fed simultaneously to a plurality of parallel channels into a serial output, said parallel channels being isolated from each other so as to prevent the transfer of charge between contiguously adjacent ones of said parallel channels, comprising the combination:
    delay means comprising said plurality of parallel channels, for delaying charge packets fed into said device at predetermined time durations;
    clocking means, coupled to the delay means, for providing transfer capability to said charge packets between said delay means; and
    summing means, coupled to said plurality of channels, for converting a plurality of charge packets fed to said device in parallel mode to a sequential output of said charge packets without inter-transfer of any of the charge packets between the paralled channels.

2. The CCD multiplexer of claim 1, wherein said summing means is a single screen electrode gate coupled to the outputs of the parallel channels and a dopant diffusion coupled to the screen electrode gate for electronically connecting the outputs of said plurality of parallel channels and for creating a single output channel for said device.

3. The CCD multiplexer of claim 2, including a load connected to said single output channel.

4. The CCD multiplexing device of claim 1, wherein said delay means comprises:
    a unidirectional charge propagating storage electrode disposed across all of said channels to form a first gate in each channel for storing the charge input to said multiplexing device from each channel; and
    at least one unidirectional charge propagating delay electrode disposed across a selected number of said channels for receiving the charges stored on the first gate of each channel and for delaying the transfer of the charge from each channel to the output of said delay means by a unique amount.

5. The CCD multiplexer of claim 1, wherein said summing means comprises:
    a screen electrode gate disposed across all channels after the plurality of delay electrodes for receiving sequentially appearing charges from said channels;
    collecting diffusion means disposed beneath said output electrode for collecting the sequentially appearing charges; and
    an output circuit connected to said diffusion means.

6. The CCD multiplexer of claim 5 wherein said output circuit comprises:
    a. a capacitance coupled between said collecting diffusion and ground;
    b. a resistor coupled between said collecting diffusion and a drain voltage; and
    c. amplifying means having an input coupled to said collecting diffusion wherein the output of said amplifying means is the output of said CCD multiplexer.

7. The CCD multiplexer of claim 4 wherein said summing means comprises a floating gate.

8. The CCD multiplexer of claim 4 wherein said summing means comprises a reset diffusion.

9. The CCD multiplexing device of claim 1, including:
- a single unidirectional charge propagation electrode; and
- a plurality of clocks composing said clocking means, wherein each of said clocks from said clocking means is coupled to the single unidirectional charge propagation electrode.

* * * * *